(12) United States Patent
Dotan et al.

(10) Patent No.: US 10,063,549 B1
(45) Date of Patent: Aug. 28, 2018

(54) TECHNIQUES FOR SHARING AUTHENTICATION DATA AMONG AUTHENTICATION SERVERS

(75) Inventors: Yedidya Dotan, Tel Aviv (IL); Lawrence N. Friedman, Arlington, MA (US); Sean Patrick Doyle, Edmonds, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/169,668

(22) Filed: Jun. 27, 2011

(51) Int. Cl.
*H04L 29/06* (2006.01)

(52) U.S. Cl.
CPC ................... *H04L 63/10* (2013.01)

(58) Field of Classification Search
CPC ........ G06F 21/30; G06F 21/316; G06F 21/50; G06F 21/566; G06F 21/554; H04L 9/00; H04L 29/06911; H04L 29/06986; H04L 63/10; H04N 21/44236
USPC .......................................................... 726/3
See application file for complete search history.

(56) References Cited

U.S. PATENT DOCUMENTS

| | | |
|---|---|---|
| 7,810,147 B2 | 10/2010 | Duane et al. |
| 8,413,221 B2 | 4/2013 | Kaliski, Jr. et al. |
| 8,495,372 B2 | 7/2013 | Bailey et al. |
| 8,695,097 B1 * | 4/2014 | Mathes ............... H04L 63/08 726/25 |
| 2004/0003286 A1 * | 1/2004 | Kaler et al. ............... 713/201 |
| 2005/0102210 A1 * | 5/2005 | Song ..................... G06Q 10/10 705/35 |
| 2007/0204033 A1 * | 8/2007 | Bookbinder et al. ......... 709/224 |
| 2009/0013410 A1 * | 1/2009 | Kaler et al. ............... 726/25 |
| 2009/0319361 A1 * | 12/2009 | Conrady ................ 705/14.26 |
| 2012/0130843 A1 * | 5/2012 | Himmerick et al. ........ 705/26.3 |

FOREIGN PATENT DOCUMENTS

| | | |
|---|---|---|
| WO | 2001086392 A2 | 11/2001 |
| WO | 2008136602 A1 | 11/2008 |

* cited by examiner

*Primary Examiner* — Tamara Teslovich Kyle
(74) *Attorney, Agent, or Firm* — BainwoodHuang

(57) ABSTRACT

A technique of supporting multi-factor authentication uses a database server. The technique involves receiving suspicious user activity data from a first set of authentication servers and storing the suspicious user activity data from the first set of authentication servers, as sharable authentication data, in a database of the database server. The technique further involves providing the sharable authentication data from the database to a second set of authentication servers. Each authentication server of the second set of authentication servers performs multi-factor authentication operations based on (i) local authentication data which is gathered by that authentication server and (ii) the sharable authentication data provided from the database. Accordingly, useful authentication data from one authentication server (e.g., a network address of a computer which mischievously attempts to probe or infiltrate that authentication server) can be shared with other authentication servers to enhance their ability to identify fraudsters.

18 Claims, 5 Drawing Sheets

TECHNIQUES FOR SHARING AUTHENTICATION DATA AMONG AUTHENTICATION SERVERS

BACKGROUND

Electronic authentication is the process of determining whether a user (or device) is authentic or an imposter. During the authentication process, an authentication server compares current information received from the user with expected information to determine whether the user is authentic, i.e., whether the user is a particular person.

Single factor authentication involves an evaluation of only one authentication factor when determining whether the user is authentic. For example, suppose that a user uses a computer to login to a website as a particular person. The authentication server for the website may receive a username identifying the particular person and a password (the authentication factor). The authentication server then compares the received password to a previously stored password for the particular person to determine whether the user is actually the particular person.

Likewise, two factor authentication involves an evaluation of two factors when determining whether the user is authentic. Again, suppose that a user uses a computer to login to a website as a particular person. For two factor authentication, the authentication server for the website may receive a username identifying the particular person as well as (i) a one-time passcode (OTP) from an authentication token that the user possesses (the first authentication factor), and (ii) an adaptive authentication result which is based on information from the user's computer (the second authentication factor). The authentication server then (i) compares the received OTP to an expected OTP and (ii) evaluates the adaptive authentication result against a predefined threshold to determine whether the user is actually the particular person. Authentication is successful only if evaluation of both authentication factors results in a positive outcome.

SUMMARY

An improvement can be made to the above-described conventional authentication approaches. In particular, authentication servers can be configured to identify suspicious devices (e.g., by IP address) and then share this information with other authentication servers. Along these lines, one can appreciate that a fraudster may attempt to deceive multiple authentication servers in parallel rather than limit activity simply to one authentication server.

For instance, a fraudster may attempt to gain access to a first computerized resource controlled by a first authentication server maintained by a first company, and concurrently attempt to gain access to a second computerized resource controlled by a second authentication server maintained by a second company in order to increase the chance of gaining access to at least one computerized resource. The first and second authentication servers may then update their local databases to indicate that equipment used by the fraudster is suspicious, e.g., the authentication servers may store the IP address of the fraudster's equipment. Unfortunately, for confidentiality and liability purposes, it is unlikely that the first and second companies allow their authentication servers to share authentication information. Accordingly, the fraudster may succeed at gaining access to at least one computerized resource.

However, in accordance with improved techniques described herein, authentication servers are able to share their information regarding suspicious devices (e.g., suspicious IP addresses). Additionally, authentication servers are able to perform multi-factor authentication operations which include, as an authentication factor, an evaluation of current device information to the suspicious device information which is shared among authentication servers. Such operation leads to effective multi-factor authentication which includes, as a factor, something that the user is not. That is, in additional to one or more other authentication factors, an improved authentication process evaluates an extra factor, e.g., whether the user (or user's device) was previously labeled by an authentication server as a suspicious user (or suspicious user's device). Such an evaluation is capable being combined with a wide range of other authentication processes (e.g., single factor authentication, adaptive authentication, etc.).

One embodiment is directed to a method of supporting multi-factor authentication using a database server. The method includes receiving suspicious user activity data from a first set of authentication servers and storing the suspicious user activity data from the first set of authentication servers, as sharable (or shared) authentication data, in a database of the database server. The method further includes providing the sharable authentication data from the database to a second set of authentication servers. Each authentication server of the second set of authentication servers performs multi-factor authentication operations based on (i) local authentication data which is gathered by that authentication server and (ii) the sharable authentication data provided from the database. As a result, useful authentication data from one authentication server (e.g., a computer address of a computer which mischievously attempts to probe or deceive that authentication server) can be shared with other authentication servers to enhance their ability to identify fraudsters.

Other embodiments are directed to a database server, a method of authentication, an authentication server, computer program products, an eFraud network (EFN), and other components or systems of an EFN. Additionally, other embodiments are directed to processes which are performed by the above-mentioned components or systems of an EFN.

It should be understood that these improved techniques are suitable for a variety of situations and industries including computer security, access control, online shopping, online banking and securities transactions, medical records management, online gaming, and so on. One suitable environment is described in U.S. patent application Ser. No. 12/751,057, entitled "TECHNIQUES FOR AUTHENTICATING USERS OF MASSIVE MULTIPLAYER ONLINE ROLE PLAYING GAMES USING ADAPTIVE AUTHENTICATION," the teachings of which are hereby incorporated by reference in their entirety.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

An improved technique involves sharing authentication data among multiple authentication servers. Such sharing of authentication data allows the authentication servers to combine their authentication data and thus enhance detection of fraudsters. For example, the authentication data from a first authentication server which identifies an untrustworthy network address may help a second authentication server prevent a fraudster at that network address from gaining access to a computerized resource. In some arrangements, a trusted third party device pools together authentication data from multiple authentication servers and suppresses sensitive information within the authentication data such as entity and user identities for confidentiality and liability purposes.

Figure 1:
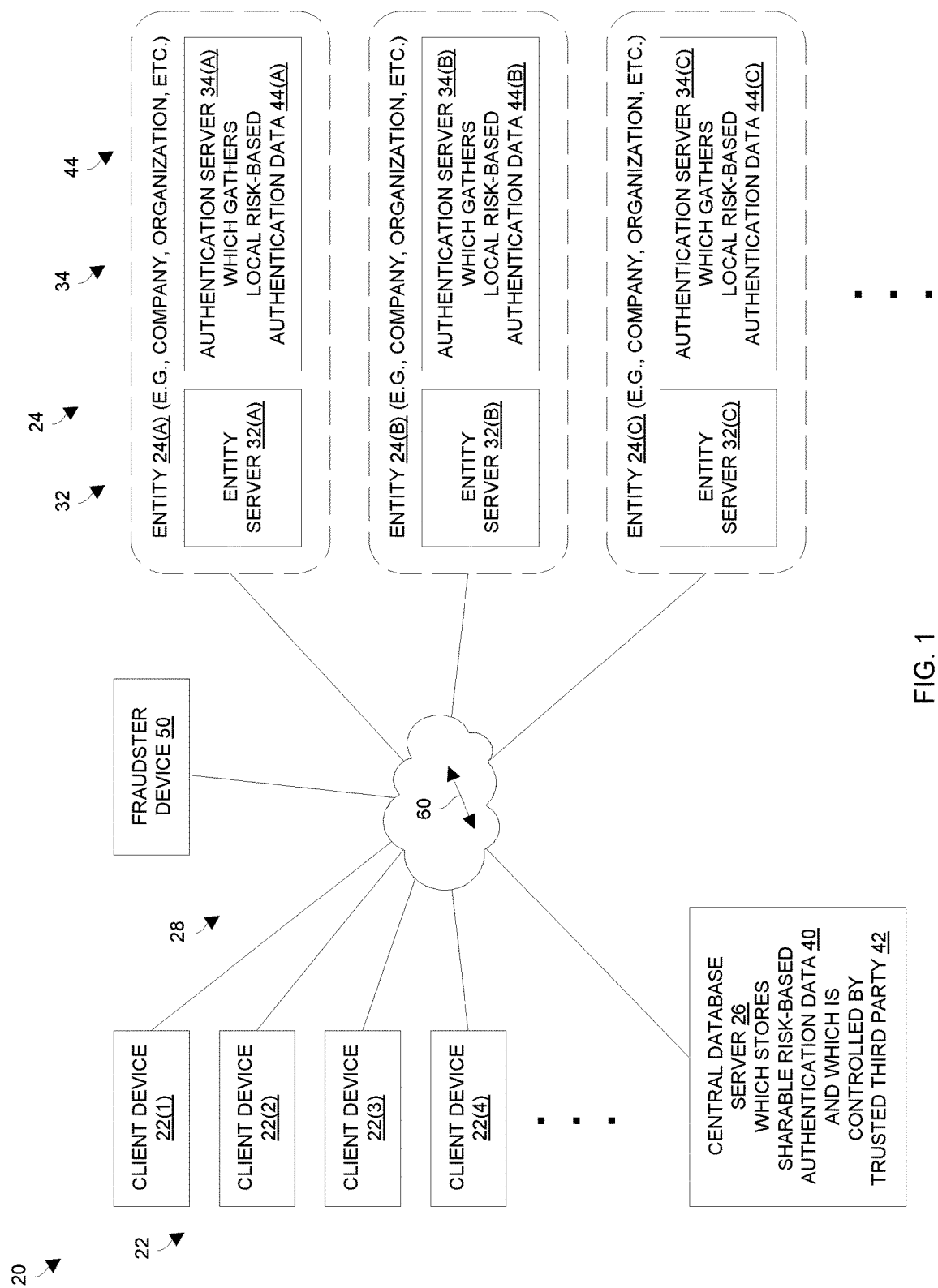
FIG. 1 is a block diagram of an electronic environment which effectuates sharing of authentication data among multiple authentication servers via a database server.

FIG. 1 is a block diagram of an electronic environment 20 which effectuates sharing of authentication data to improve authentication results. The electronic environment 20 includes client devices 22(1), 22(2), 22(3), 22(4), . . . (collectively, client devices 22), entities 24(A), 24(B), 24(C), . . . (collectively, entities 24), central database server 26, and communications medium 28.

Each client device 22 is operated by a user and is capable of consuming a service (or accessing a computerized resource) from one or more of the entities 24. Examples of suitable client devices 22 include general purpose computers, laptops, smart phones, portable computerized devices, specialized hardware, and so on.

Each entity 24 represents an independent computerized facility such as the computer system for a company. As shown, each entity 24 includes an entity server 32 which provides a service and an authentication server 34 which authenticates users of the client devices 22 on behalf of that entity server 32. In particular, entity 24(A) includes entity server 32(A) and authentication server 34(A). Similarly, entity 24(B) includes entity server 32(B) and authentication server 34(B), entity 24(C) includes entity server 32(C) and authentication server 34(C), and so on. Examples of suitable entities 24 include corporations, financial institutions, health organizations, online stores, government agencies, and other establishments that utilize authentication.

It should be understood that the authentication server 34 of each entity 24 is considered at an "on-premises location" because it is under control of that entity 24 not a different entity/third party. In some arrangements, the authentication server 34 and the entity server 32 reside at the same geographical location (e.g., within the same computerized system, within the same computer room, etc.). In other arrangements, the authentication server 34 and the entity server 32 reside at different geographical locations, but the authentication server 34 is nevertheless referred to as being at an on-premises location with regard to the entity 24.

The central database server 26 stores sharable authentication data 40 and is controlled by a trusted third party 42. As will be explained in further detail shortly, the central database server 26 collects local authentication data 44(A), 44(B), 44(C) (collectively, local authentication data 44) from the individual entities 24 and makes such data 44 available to the entities 24 in the form of the sharable authentication data 40 (e.g., as a subscription service). This locally gathered authentication data 44 may include information regarding suspicious user activity such as network addresses of devices which have failed authentication an excessive number of times, or which have performed suspicious operations (e.g., probing of the entity's computerized facility) resulting in placement of the network address on a local list of untrustworthy devices, and so on.

Accordingly, authentication servers 34 now have access to an additional authentication factor, i.e., device information that an authentic user or device should not have. Accordingly, authentication servers 34 can now make sure users are not on a suspicious user list or that user devices are not on a suspicious device list. Moreover, the entities 24 are able to perform multi-factor authentication operations using the sharable authentication data 40 and thus more-securely protect data on the entity servers 32 from potential fraudsters such as the fraudster device 50.

The communications medium 28 connects the various electronic components of the electronic environment 20 together to enable the electronic components to exchange electronic communications 60 (e.g., see the double arrow 60). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based devices and cabling, fiber optic devices and cabling, wireless devices, combinations thereof, and so on. Moreover, some portions of the communications medium 28 may include a computer network (e.g., the Internet, a LAN, a VPN, etc.) while other portions may include a different type of network (e.g., SAN hardware, etc.).

During operation, the entity servers 32 provide services to the client devices 22. For example, entity 24(A) may be a banking institution, and entity server 32(A) may perform banking transactions to online bank customers using the client devices 22. As another example, entity 24(B) may be another banking institution and entity server 32(B) may perform banking transactions to online bank customers using the client devices 22. As yet another example, the entity 24(C) may be an online store and entity server 32(C) may sell products (and/or services) to online shoppers using the client devices 22. Of course, other situations are suitable for use as well.

Additionally, the authentication servers 34 perform multi-factor authentication operations to control access to the entity servers 32. In particular, authentication server 34(A) performs multi-factor authentication operations to authenticate users of the client devices 22 in connection with access to the entity server 32(A). Similarly, authentication server 34(B) performs multi-factor authentication operations to authenticate users of the client devices 22 in connection with access to the entity server 32(B), and so on.

Advantageously, the authentication servers 34 are capable of subscribing to the central database server 26 to obtain access to the sharable authentication data 40. Accordingly, participating authentication servers 34 are able to factor in knowledge from other authentication servers 34. In the above-provided examples, the authentication server 34(B) which is a banking institution may enjoy access to the authentication data 44(A) from authentication server 34(A) of another banking institution (i.e., an entity in the same industry) as well as authentication data 44(C) from authentication server 34(C) (i.e., an entity in a different but perhaps somewhat related industry). Such operation results in a competent eFraud network (EFN) with improved security against imposters such as a malicious attacker operating the fraudster device 50. Further details will now provided with reference to FIG. 2.

Central Database Server

Figure 2:
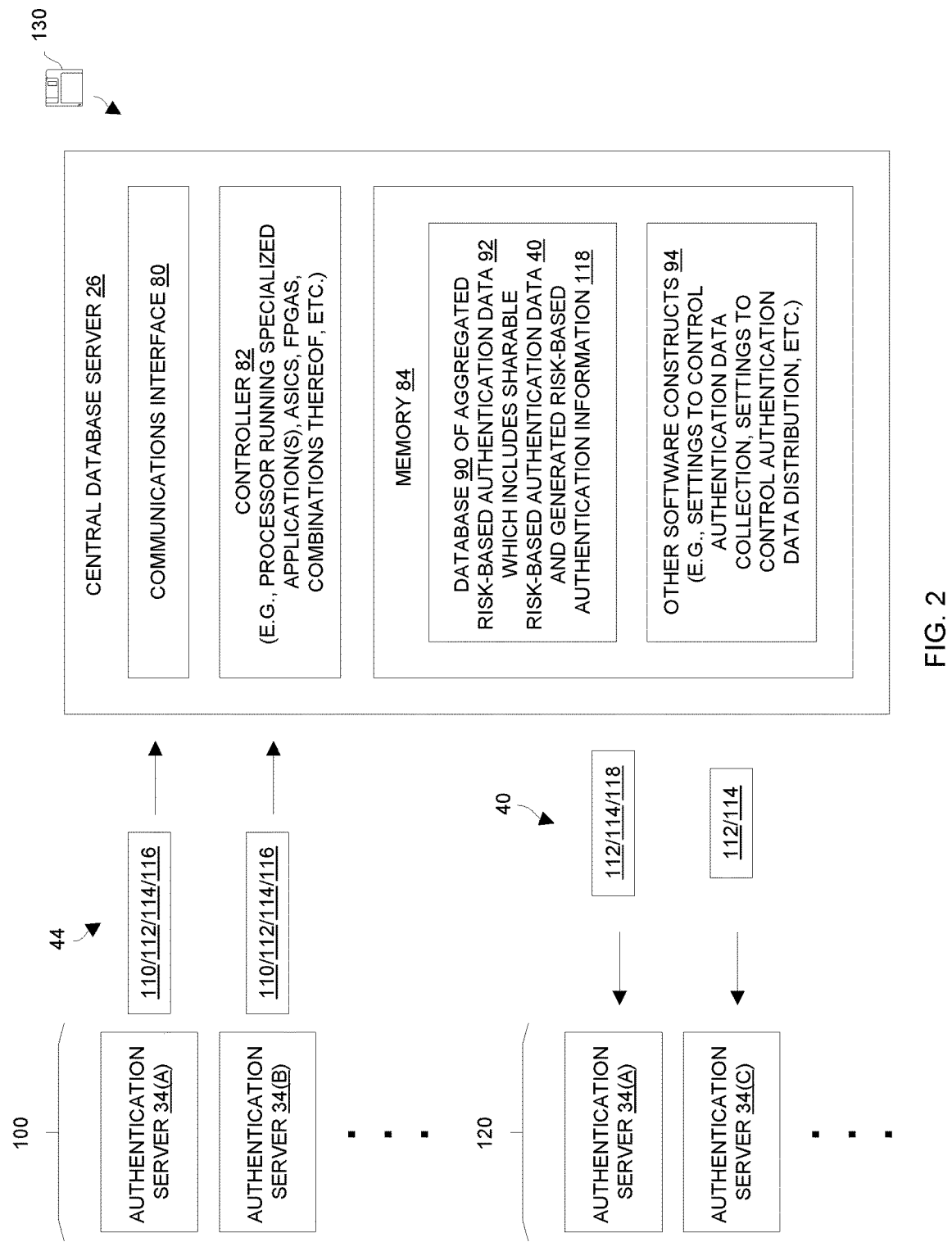
FIG. 2 is a block diagram of the database server of FIG. 1.

FIG. 2 is a block diagram of the central database server 26 of the electronic environment 20. The central database server 26 includes a communications interface 80, a controller 82, and memory 84. The communications interface 80 (e.g., a network adapter, a network card, etc.) is constructed and arranged to connect to the communications medium 28 and thus enable the central database server 26 to exchange electronic communications with other devices through the communications medium 28 (also see the arrow 60 in FIG. 1). The controller 82 (e.g., a set of processors and memory) is constructed and arranged to perform a variety of computerized operations or tasks. The memory 84 (e.g., magnetic disk drives, semiconductor storage, etc.) is constructed and arranged to store, among other things, (i) a database 90 of aggregated authentication data 92 which includes the sharable authentication data 40 (also see FIG. 1) and (ii) other software constructs 94 (e.g., settings to control collection of authentication data 44 from the authentication servers 34, settings to control distribution of the sharable authentication data 40, etc.).

During operation, the central database server 26 receives, as input, the local authentication data 44 which is gathered by a source group 100 of authentication servers 24. In particular, the central database server 26 acquires respective authentication data 44 from each authentication server 34 of the source group 100. By way of example only, authentication servers 34(A) and 34(B) are shown as belonging to the source group 100 (see FIG. 2).

It should be understood that the authentication data 44 which is received from the authentication servers 34 of the source group 100 includes identification information 110, device-specific authentication information 112, general authentication information 114, and authentication server status information 116. For each transmission of authentication data 44 from an authentication server 34, the identification information 110 identifies the particular authentication server 34 providing that authentication data 44. Additionally, the device-specific authentication information 112 includes data regarding specific devices (e.g., network addresses and geographical locations of devices which have failed at least a certain number of times, other authentication failure data and suspicious user activity data, etc.). Furthermore, the general authentication information 114 includes data regarding general operating conditions from the perspective of the authentication server 34 providing the authentication data 44 (e.g., ISP address/location information, daily network traffic patterns, etc.). Also, the authentication server status information 116 includes data regarding status of the authentication server 34 such as indications of whether the authentication server 34 was attacked, whether the authentication server encountered any anomaly events, etc.).

In some arrangements, each authentication server 34 of the source group 100 is configured to push locally gathered authentication data 44 to the central database server 26 periodically in accordance with a schedule. In other arrangements, the central database server 34 pulls the locally gathered authentication data 44 from each authentication server 34 of the source group 100 in accordance with a schedule (e.g., see the other software constructs 94 in FIG. 2). In either type of arrangement, each authentication server 34 may send the locally gathered authentication data 44 to the central database server 34 once a day, once a week, once a month, etc. In some arrangements, each authentication server 34 initially sends all of the locally gathered authentication data 44 it has collected, and thereafter only incremental updates of new gathered authentication data 44.

As the authentication data 44 arrives from each authentication server 34 of the source group 100, the controller 82 receives the authentication data 44 through the communications interface 80 and saves that authentication data 44 within the existing database 90 of aggregated authentication data 92. Along these lines, the controller 82 merges the device-specific authentication information 112 with existing device-specific authentication information 112 so that the database 90 contains device-specific authentication information 112 from multiple authentication servers 34 across multiple entities 34 (i.e., the database 90 now has a collection of untrustworthy network addresses from multiple authentication servers 34). Similarly, the controller 82 merges the general authentication information 114 with existing general authentication information 114 so that the database 90 contains general authentication information 114 from multiple authentication servers 34 across multiple entities 24 (e.g., the database 90 now has a collection traffic information, ISP location information, etc. from multiple authentication servers 34). Accordingly, the database 90 is enhanced with data accumulated over multiple entities 24 thus providing a richer base of authentication information than authentication data gathered from a single entity.

As the controller 82 saves the authentication data 44 within the database 90, the controller 82 reviews the identification information 110 and the authentication server status information 116 as well. Such operation enables the controller 82 to generate additional authentication information 118 such as trend data or correlation data from multiple entities 24. In some situations, the controller 82 may conclude that a fraudster exists (e.g., see the fraudster device 50 in FIG. 1) based on the authentication data 44 from multiple authentication servers 34. As a result, the aggregated authentication data 92 continues to include new authentication data 44 from the source group 100 of authentication servers 34 and grows over time.

Further during operation, the central database server 26 provides, as output, the sharable authentication data 40 to a target group 120 of authentication servers 24. In particular, the central database server 26 extracts a portion of the aggregated authentication data 92 and provides that portion, as the sharable authentication data 40, to each authentication server 34 of the target group 120. By way of example only, authentication servers 34(A) and 34(C) belong to the target group 120 (see FIG. 2).

Based on this example, one should appreciate that the authentication servers 34 of the source group 100 and the target group 120 do not need to match. Along these lines, the authentication server 34(A) belongs to both groups 100, 120. However, the authentication server 34(B) only belongs to the source group 100. Additionally, the authentication server 34(C) only belongs to the target groups 120.

In some arrangements, each authentication server 34 of the target group 120 is configured to pull sharable authentication data 40 from the central database server 26 periodically in accordance with a schedule. In other arrangements, the central database server 34 pushes sharable authentication data 40 to each authentication server 34 of the target group 120 in accordance with a schedule (e.g., see the other software constructs 94 in FIG. 2).

Additionally, in some arrangements, the other software constructs 94 dictate which specific portions of the sharable authentication data 92 (e.g., the device-specific authentication information 112, the general authentication information 114, etc.) to provide to each authentication server 34 on a server by server basis. Such operation allows the controller 82 of the central database server 26 to individually select particular sharable authentication aspects to send each authentication server 34 as part of a subscription service (e.g., a subscriber on an eFraud network or EFN). For instance, the other software constructs 94 directs the controller 82 to provide the device-specific authentication information 112, the general authentication information 114, and the generated additional authentication information 118 (trend data, correlation data, etc.) to the authentication server 34(A). Furthermore, the other software constructs 94 directs the controller 82 to provide only the device-specific authentication information 112, and the general authentication information 114 to the authentication server 34(C).

In some arrangements, the sharable authentication data 40 which the central database server 26 sends to the target group 120 purposefully does not include the identification information 110 and the authentication server status information 116 from the locally gathered authentication data 44. Rather, the identification information 110 is suppressed (or withheld) to maintain confidentiality on behalf of the source group 100 of authentication servers 34 as well as for liability purposes.

It should be understood that the controller 82 is capable of being implemented in different manners. In particular, such circuitry can be implemented as one or more processors running in accordance with one or more specialized software applications, as specialized hardware circuits (e.g., application specific integrated circuits, field programmable gate arrays, discrete components, etc.), as firmware, combinations thereof, and so on.

Additionally, in the context of one or more processors running in accordance with specialized software, a computer program product 130 is capable of delivering all or portions of the software to the central database server 26. The computer program product 130 has a non-transitory (or non-volatile) computer readable storage medium which stores a set of instructions which controls operation of the controller 82. Examples of suitable computer readable storage media include tangible articles of manufacture and apparatus which store instructions in a non-volatile manner such as CD-ROM, flash memory, disk memory, tape memory, and the like. Further details will now be provided with reference to FIG. 3.

Figure 3:
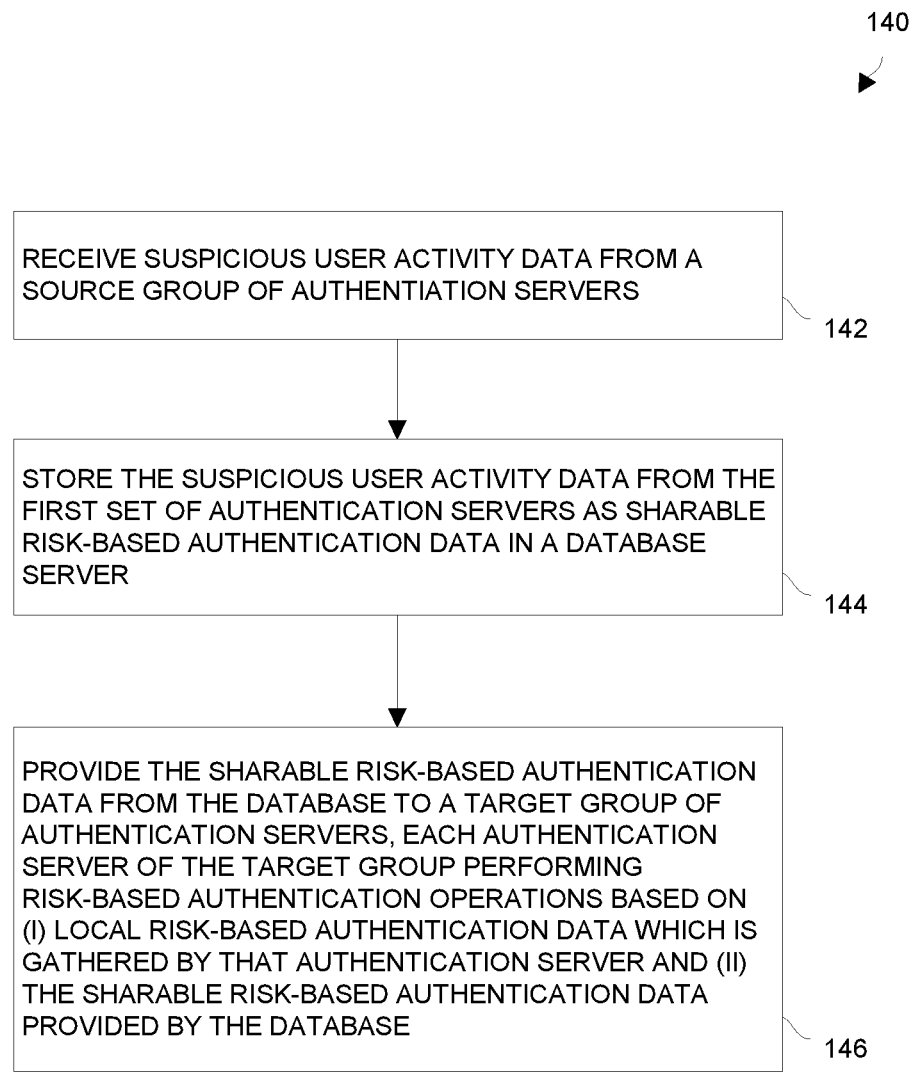
FIG. 3 is a flowchart of a procedure which is performed by the database server of FIG. 2.

FIG. 3 is a flowchart of a procedure 140 which is performed by the central database server 26. In step 142, the central database server 26 receives suspicious user activity data from the source group 100 of authentication servers 34 (also see the components 110, 112, 114, 116 of the local authentication data 44 in FIG. 2). Such receipt occurs in an ongoing manner over time (e.g., nightly, weekly, monthly, and so on).

In step 144, the central database server 26 stores the suspicious user activity data from source group 100 of authentication servers 34, as the aggregated authentication data 92 (FIG. 2), in the database 90 of the central database server 26.

In step 146, the central database server 26 provides at least a portion of the aggregated authentication data 92 (i.e., the sharable authentication data 40) from the database 90 to a target group 120 of authentication servers 34. Each authentication server 34 of the target group 120 performs multi-factor authentication operations based on (i) local authentication data 40 which is gathered by that authentication server 34 and (ii) the sharable authentication data 40 provided from the database 90. Accordingly, the authentication servers 34 of the target group 120 enjoy the ability to perform multi-factor authentication operations based on richer authentication information.

Authentication Server

Figure 4:
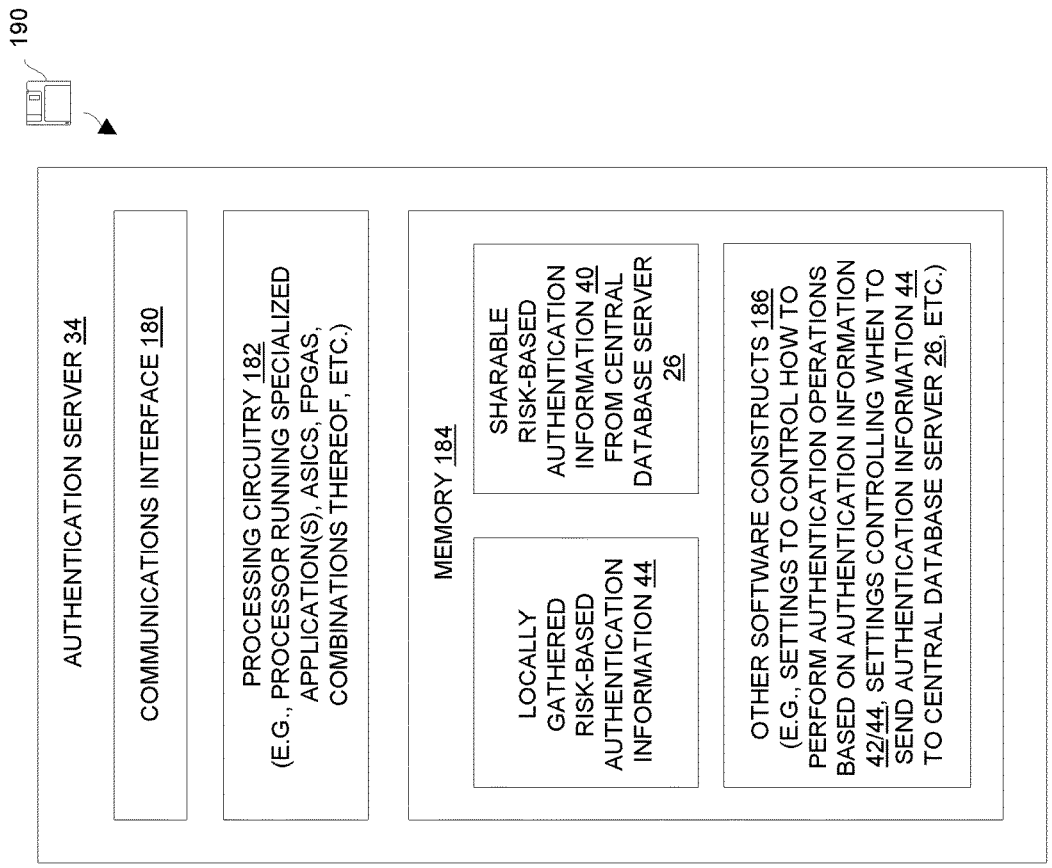
FIG. 4 is a block diagram of an authentication server of FIG. 1.

FIG. 4 is a block diagram of an on-premises authentication server 34 of an entity 24 of the electronic environment 20. The authentication server 34 includes a communications interface 180, a processing circuitry 182, and memory 184. The communications interface 80 (e.g., a network adapter, a network card, etc.) is constructed and arranged to communicate with external devices such as the on-premises entity server 32 of that entity 24 as well as other devices through the communications medium 28 (FIG. 1). The processing circuitry 182 is constructed and arranged to perform a variety of computerized operations or tasks. The memory 184 (e.g., magnetic disk drives, semiconductor storage, etc.) is constructed and arranged to store locally gathered authentication information 44, sharable authentication information 40 received from the central database server 26 (FIG. 2), and other software constructs 186 (e.g., control settings).

During operation, the processing circuitry 182 of the authentication server 34 receives authentication requests from the entity server 32 through the communications interface 180. In response to the authentication requests, the processing circuitry 182 performs multi-factor authentication operations to determine whether users of client devices 22 (FIG. 1) should be allowed to access computer resources of the entity server 24. In particular, the processing circuitry 182 compares current user information and authentication information 42, 44 stored in the memory 184 to generate risk scores. The processing circuitry 182 compares these risk scores to a predetermined threshold (e.g., see the other software constructs 94 in FIG. 4). If the risk scores exceed the predetermined threshold, authentication is successful and the authentication server 34 sends signal to the entity server 34 through the communications interface 180 which permit the users of the client devices 22 to access the computer resources of the entity server 24. However, if the risk scores do not exceed the predetermined threshold, authentication is unsuccessful and the authentication server 34 takes remedial measures (e.g., challenges the user for additional authentication information, denies access to the computerized resource, sends a warning message to an administrator, etc.).

While the processing circuitry 182 performs multi-factor authentication operations and even after the processing circuitry 182 authenticates users of client devices 22, the processing circuitry 182 continues to locally gather authentication information 44 in the memory 184. Such authentication information 44 may include computer addresses for the client devices 22, ISP network addresses, geographic location data, tracking cookie information, and other authentication data).

For example, the processing circuitry 182 may query a web browser running on a client device 22 to determine the foreign language capabilities of the client device 22, and whether the foreign language capabilities change over time. A sudden change in the foreign language capabilities may, as one of several risk factors, indicate that an imposter is now posing as a previous user and that remedial action should be taken.

If the authentication server 34 belongs to a source group 100 of authentication servers 34 which contribute locally gathered authentication information 44 to the central database server 26 (also see FIG. 2), the authentication server 34 sends the locally gathered authentication information 44 to the central database server 26 through the communications medium 28. In some arrangements, the processing circuitry 182 pushes the authentication information 44 to the central database server 26 in accordance with a schedule (e.g., see the other software constructs 186 in FIG. 3). In other arrangements, the central database server 26 pulls the authentication information 44 from the authentication server 34 in accordance with a schedule. In some arrangements, the processing circuitry 182 sends the authentication data 44 to the central database server 26 in substantially the same format as that which is used when storing the authentication data 44 locally in the memory 184.

If the authentication server 34 belongs to a target group 120 of authentication servers 34 which routinely receives sharable authentication information 42 from the central database server 26 (also see FIG. 2), the processing circuitry 182 stores that sharable authentication information 42 in the memory 184. Accordingly, the processing circuitry 182 is able to perform multi-factor authentication operations based on both local authentication data 44 (i.e., gathered on-premises) as well as the sharable authentication data 40.

It should be understood that the processing circuitry 182 is capable of being implemented in different manners. In particular, such circuitry can be implemented as one or more processors running in accordance with one or more specialized software applications, as specialized hardware circuits (e.g., application specific integrated circuits, field programmable gate arrays, discrete components, etc.), as firmware, combinations thereof, and so on.

Additionally, in the context of one or more processors running in accordance with specialized software, a computer program product 190 is capable of delivering all or portions of the software to the authentication server 34. The computer program product 190 has a non-transitory (or non-volatile) computer readable storage medium which stores a set of instructions which controls operation of the processing circuitry 182. Examples of suitable computer readable storage media include tangible articles of manufacture and apparatus which store instructions in a non-volatile manner such as CD-ROM, flash memory, disk memory, tape memory, and the like. Further details will now be provided with reference to FIG. 5.

Figure 5:
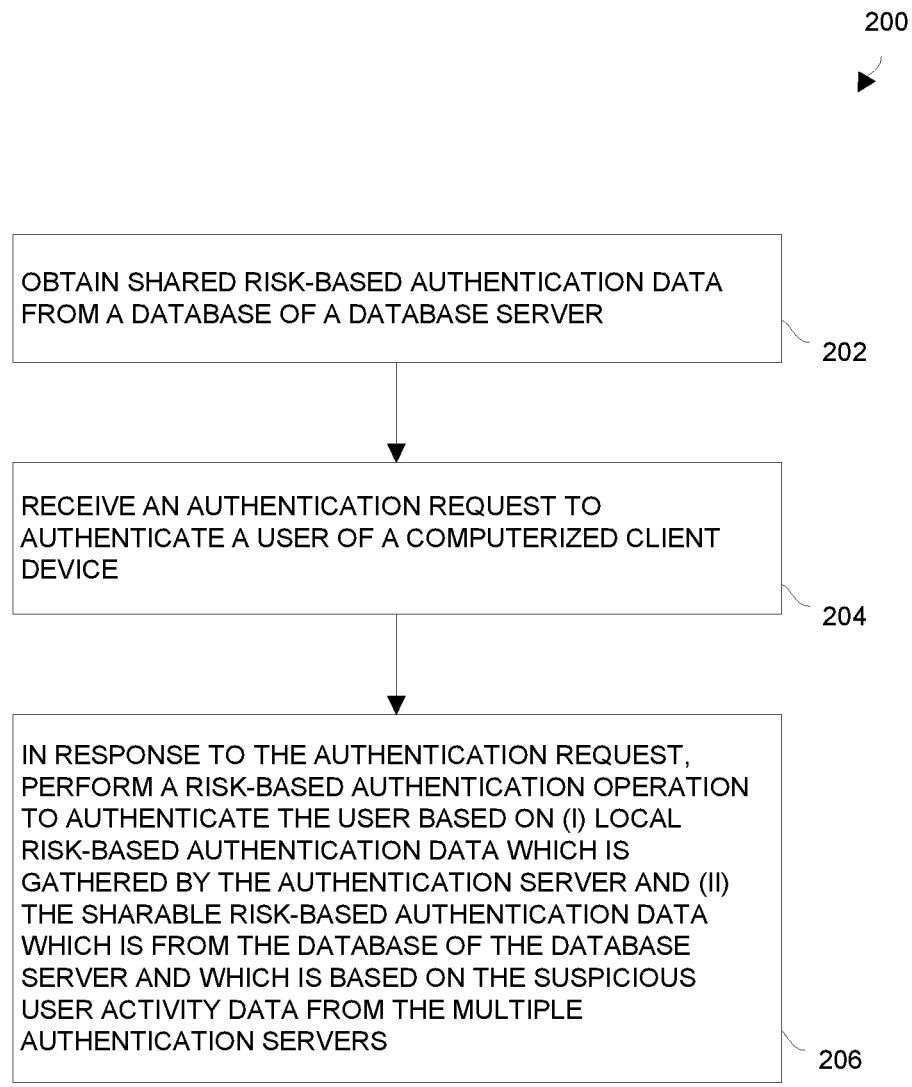
FIG. 5 is a flowchart of a procedure which is performed by the authentication server of FIG. 4.

FIG. 5 is a flowchart of a procedure 200 which is performed by an authentication server 34 of the target group 120 of authentication servers 34. In step 202, the authentication server 34 obtains the shared authentication data 40 from the database 90 of the central database server 26. The shared authentication data 40 is based on suspicious user activity data from multiple authentication servers 34.

In step 204, the authentication server 34 receives an authentication request from an entity server 32. The authentication request directs the authentication server 34 to perform a multi-factor authentication operation to authenticate a user a client device 22 (FIG. 1).

In step 206, in response to the authentication request, the authentication server 34 performs a multi-factor authentication operation to authenticate the user based on (i) the local authentication data 44 which is gathered by the authentication server 34 and (ii) the sharable authentication data 40 which is from the database 90 of the central database server 26 and which is based on the suspicious user activity data from the multiple authentication servers 34 (also see the source group 100 of authentication servers 34 in FIG. 2). Thus, the authentication server 34 advantageously performs multi-factor authentication operations based on richer authentication information.

Further Details

As mentioned above, an improved technique involves sharing authentication data 40 among multiple authentication servers 34. Such sharing of authentication data 40 allows the authentication servers 34 to aggregate their locally gathered authentication data 44 and thus enhance detection of fraudsters. For example, the authentication data 44(A) from one authentication server 34(A) which identifies an untrustworthy network address may help another authentication server 34(B) prevent a fraudster at the untrustworthy network address from gaining access to a computerized resource. In some arrangements, the authentication data 44 from multiple authentication servers 34 is pooled together by a trusted third party 42 and sensitive information 112 within the authentication data 44 such as company and user identities is suppressed for confidentiality and liability purposes.

While various embodiments of the invention have been particularly shown and described, it will be understood by those skilled in the art that various changes in form and details may be made therein without departing from the spirit and scope of the invention as defined by the appended claims.

For example, the central database server 26 was described above as being controlled by a trusted third party. It should be understood that the authentication data stored in the database 90 can be used directly by an authentication server 34 to perform multi-factor authentication operations. That is, the database 90 is capable of operating as both a repository of sharable authentication data for distribution to other authentication servers 34, but also as a database for multi-factor authentication operations performed by an authentication server controlled by the third party.

Additionally, it should be understood that the above-described authentication servers 34 are able to perform multi-factor authentication operations which include, as an authentication factor, an evaluation of current device information to the suspicious device information which is shared among authentication servers 34. Such operation leads to effective multi-factor authentication which includes, as a factor, something that the user is not. That is, in additional to one or more other authentication factors, an improved authentication process evaluates an extra factor, e.g., whether the user (or user's device) was previously labeled by an authentication server 34 as a suspicious user (or suspicious user's device).

Such an evaluation is capable being combined with a wide range of other authentication processes. In particular, the above-described techniques are suitable for use in non adaptive authentication situations. Additionally, the above-described techniques are suitable for use in risk-based authentication situations. Such modifications and enhancements are intended to belong to various embodiments.

What is claimed is:

1. In a database server, a method of supporting multi-factor authentication, the method comprising:
receiving suspicious user activity data from a first authentication server, the suspicious user activity data including (i) data received by the first authentication server in authentication requests from users authenticated by the first authentication server and (ii) identifying information about the first authentication server;

storing, in a database of the database server, sharable authentication data, the sharable authentication data including portions of the suspicious user activity data from the first authentication server and excluding the identifying information about the first authentication server; and providing the sharable authentication data from the database to a second authentication server, the second authentication server performing multi-factor authentication operations to authenticate a user, based on (i) local authentication data which is gathered by the second authentication server and (ii) the sharable authentication data provided from the database, performing the multi-factor authentication operations including (a) generating, by the second authentication server, a risk score for authenticating the user, the risk score depending upon both (i) the local authentication data which is gathered by the second authentication server and (ii) the sharable authentication data provided from the database, (b) comparing the risk score to a predetermined threshold, and (c) generating an authentication result based on whether the risk score exceeds the predetermined threshold, wherein the first authentication server is operated by a first entity and the second authentication server is operated by a second entity, the sharable authentication data maintaining confidentiality between the first entity and the second entity by excluding identities of the first entity and the second entity, the database server thus providing the second authentication server with the suspicious user activity data received from the first authentication server to assist in performing multi-factor authentication without providing the identifying information about the first authentication server.

2. A method as in claim 1, further comprising operating the first authentication server to gather first entity specific authentication data while performing multi-factor authentication operations on behalf of the first entity.

3. A method as in claim 2 wherein the first entity specific authentication data includes first authentication failure data from authentication operations properly completed by the first authentication server operated by the first entity and resulting in unsuccessful authentication; and
   wherein receiving the suspicious user activity data from the first authentication server includes obtaining the first authentication failure data from the first authentication server operated by the first entity.

4. A method as in claim 3 wherein providing the sharable authentication data from the database to the second authentication server includes:
   sharing the first authentication failure data from the first authentication server operated by the first entity with a third authentication server operated by a third entity which is different from the first entity and the second entity.

5. A method as in claim 4 wherein sharing the first authentication failure data from the first authentication server operated by the first entity includes:
   suppressing an identity of the first entity within the first authentication failure data to conceal the first entity as a source of the first authentication failure data.

6. A method as in claim 4 wherein the first authentication server is disposed within an on-premises location of the first entity;
   wherein the second authentication server is disposed within an on-premises location of the second entity;
   wherein the third authentication server resides is disposed within an on-premises location of the third entity; and
   wherein the database server is disposed within an on-premises location of a trusted third-party entity that is different from the first entity, the second entity and the third entity.

7. A method as in claim 1 wherein the sharable authentication data includes data describing browser capabilities for a set of users; and
   wherein providing the sharable authentication data from the database to the second authentication server includes sending the data describing the browser capabilities for the set of users to the second authentication server for use in multi-factor authentication operations.

8. A method as in claim 7 wherein the data describing the browser capabilities for the set of users includes data describing foreign language compatibilities of browsers controlled by the set of users.

9. A method as in claim 1 wherein the sharable authentication data includes data describing network addresses for a set of users; and
   wherein providing the sharable authentication data from the database to the second authentication server includes sending the data describing the network addresses for the set of users to the second authentication server for use in multi-factor authentication operations.

10. A method as in claim 9 wherein the sharable authentication data further includes data describing geographical locations for the set of users; and
    wherein providing the sharable authentication data from the database to the second authentication server further includes sending the data describing the geographical locations for the set of users to the second authentication server for use in the multi-factor authentication operations.

11. A method as in claim 1, further comprising:
    receiving additional suspicious user activity data from the first authentication server at periodic intervals; and
    updating the sharable authentication data stored in the database based on the additional suspicious user activity data from the first authentication server at the periodic intervals.

12. A method as in claim 11, further comprising:
    periodically providing additional sharable authentication data from the database to the second authentication server, the second authentication server performing further multi-factor authentication operations using the additional sharable authentication data which is periodically provided from the database.

13. A multi-factor authentication database server, comprising:
    a communications interface constructed and arranged to connect to a network;
    memory having an authentication database; and
    a controller coupled to the communications interface and the memory, the controller being constructed and arranged to:
      receive suspicious user activity data from a first set of authentication servers through the communications interface, the suspicious user activity data including (i) data received by the first set of authentication servers in authentication requests from users authenticated by the first set of authentication servers and (ii) identifying information about the first set of authentication servers, store, in the authentication database, sharable authentication data, the sharable authentication data including portions of the suspicious user activity data from the first set of authentication servers and excluding the identifying information about the first set of authentication servers, and provide the sharable authentication data from the authentication database to a second set of authentication servers through the communications interface, each authentication server of the second set being constructed and arranged to perform multi-factor authentication operations to authenticate a user, based on (i) local authentication data which is gathered by that authentication server and (ii) the sharable authentication data provided from the authentication database, the controller constructed and arranged to perform the multi-factor authentication operations further constructed and arranged to (a) generate, by the authentication server of the second set, a risk score for authenticating the user, the risk score depending upon both (i) the local authentication data which is gathered by the authentication server of the second set and (ii) the sharable authentication data provided from the authentication database, (b) compare the risk score to a predetermined threshold, and (c) generate an authentication result based on whether the risk score exceeds the predetermined threshold, wherein the first set of authentication servers is operated by a first entity and the second set of authentication servers is operated by a second entity, the sharable authentication data maintaining confidentiality between the first entity and the second entity by excluding identities of the first entity and the second entity, the controller thus being constructed and arranged to provide the second set of authentication servers with the suspicious user activity data received from the first set of authentication servers to assist in performing multi-factor authentication without providing the identifying information about the first set of authentication servers.

14. A computer program product including a non-transitory computer readable medium which stores instructions that, when carried out by a computer, cause the computer to:

receive suspicious user activity data from a first set of authentication servers, the suspicious user activity data including (i) data received by the first set of authentication servers in authentication requests from users authenticated by the first set of authentication servers and (ii) identifying information about the first set of authentication servers;

store, in an authentication database, sharable authentication data, the sharable authentication data including portions of the suspicious user activity data from the first set of authentication servers; and provide the sharable authentication data from the authentication database to a second set of authentication servers, the sharable authentication data excluding the identifying information about the first set of authentication servers, each authentication server of the second set being constructed and arranged to perform multi-factor authentication operations to authenticate a user based on (i) local authentication data which is gathered by that authentication server and (ii) the sharable authentication data provided from the authentication database, the instructions causing the computer to perform the multi-factor authentication operations further causing the computer to (a) generate, by the authentication server of the second set, a risk score for authenticating the user, the risk score depending upon both (i) the local authentication data which is gathered by the authentication server of the second set and (ii) the sharable authentication data provided from the authentication database, (b) comparing the risk score to a predetermined threshold, and (c) generating an authentication result based on whether the risk score exceeds the predetermined threshold, wherein the first authentication server is operated by a first entity and the second authentication server is operated by a second entity, the sharable authentication data maintaining confidentiality between the first entity and the second entity by excluding identities of the first entity and the second entity, the instructions thus causing the computer to provide the second set of authentication servers with the suspicious user activity data received from the first set of authentication servers to assist in performing multi-factor authentication without providing the identifying information about the first set of authentication servers.

15. A method as in claim 1, wherein the suspicious user data includes identification information and device-specific authentication information, wherein the identification information identifies the first authentication server providing the suspicious user activity data, and wherein the device-specific authentication information includes network addresses of specific devices that have failed authentication at least a certain number of times.

16. A method as in claim 15, wherein the suspicious user data further includes general authentication information and authentication server status information, wherein the general authentication information includes data regarding general operating conditions from a perspective of the first authentication server, and wherein the authentication server status information includes data regarding whether the first authentication server has been attacked.

17. The method as in claim 1, further comprising, prior to receiving the suspicious user activity data from the first authentication server, obtaining the suspicious user activity data by the first authentication server in response to authentication requests made by client devices to the first authentication server.

18. In a database server, a method of supporting multi-factor authentication, the method comprising:

receiving local authentication data from a first set of authentication servers, the local authentication data including (i) suspicious user activity data obtained by the first set of authentication servers in response to authentication requests made to the first set of authentication servers and (ii) identifying information about the first set of authentication servers;

storing sharable authentication data in a database of the database server, the sharable authentication data including portions of the suspicious user activity data from the first set of authentication servers and excluding the identifying information about the first set of authentication servers; and providing the sharable authentication data from the database to a second set of authentication servers, each authentication server of the second set of authentication servers performing multi-factor authentication operations to authenticate a user based on (i) local authentication data which is gathered by that authentication server and (ii) the sharable authentication data provided from the database, wherein performing the multi-factor authentication operations includes (a) generating, by the authentication server of the second set, a risk score for authenticating the user, the risk score depending upon both (i) the local authentication data which is gathered by the authentication server of the second set and (ii) the sharable authentication data provided from the database, (b) comparing the risk score to a predetermined threshold, and (c) generating an authentication result based on whether the risk score exceeds the predetermined threshold, and wherein the first authentication server is operated by a first entity and the second authentication server is operated by a second entity, the sharable authentication data maintaining confidentiality between the first entity and the second entity by excluding identities of the first entity and the second entity, the database server thus providing the second authentication server with the suspicious user activity data received from the first authentication server to assist in performing multi-factor authentication without providing the identifying information about the first authentication server.

* * * * *